United States Patent [19]
Chappell et al.

[11] 3,906,613
[45] Sept. 23, 1975

[54] METHOD OF INSTALLING A PUSH-PULL COUPLING ON A SCRAPER VEHICLE

[75] Inventors: Charles J. Chappell; Gene R. Klett, both of Joliet, Ill.

[73] Assignee: Caterpillar Tractor Company, Peoria, Ill.

[22] Filed: Oct. 25, 1974

[21] Appl. No.: 517,947

[52] U.S. Cl. ................................. 29/426; 280/481
[51] Int. Cl. ........................................... B60d 3/00
[58] Field of Search ....................... 29/426; 280/481

[56] References Cited
UNITED STATES PATENTS
3,434,738    3/1969    Campbell et al. ............ 280/481 X
3,740,080    6/1973    Kuhl ................................ 280/481

Primary Examiner—Leo Friaglia
Attorney, Agent, or Firm—Phillips, Moore, Weissenberger, Lempio & Strabala

[57] ABSTRACT

The present invention provides a method of mounting a rearwardly extending push block unit and associated pulling hook on a vehicle in order to adapt it for push-pull operation, the vehicle including a rearwardly extending frame portion forming a verticle mounting plate, brackets being rigidly mounted upon the extended frame portion, the method comprising the steps of removing a normal push block assembly and radiator guards secured to the brackets, mounting an extended push block unit upon the vertical mounting plate and then securing a hook unit in releasable engagement with the brackets and in structural engagement with the extended push block unit in order to provide rigid structural support for the hook and extended push block unit while facilitating removal of the pulling hook and push block unit from the vehicle when desired.

5 Claims, 4 Drawing Figures

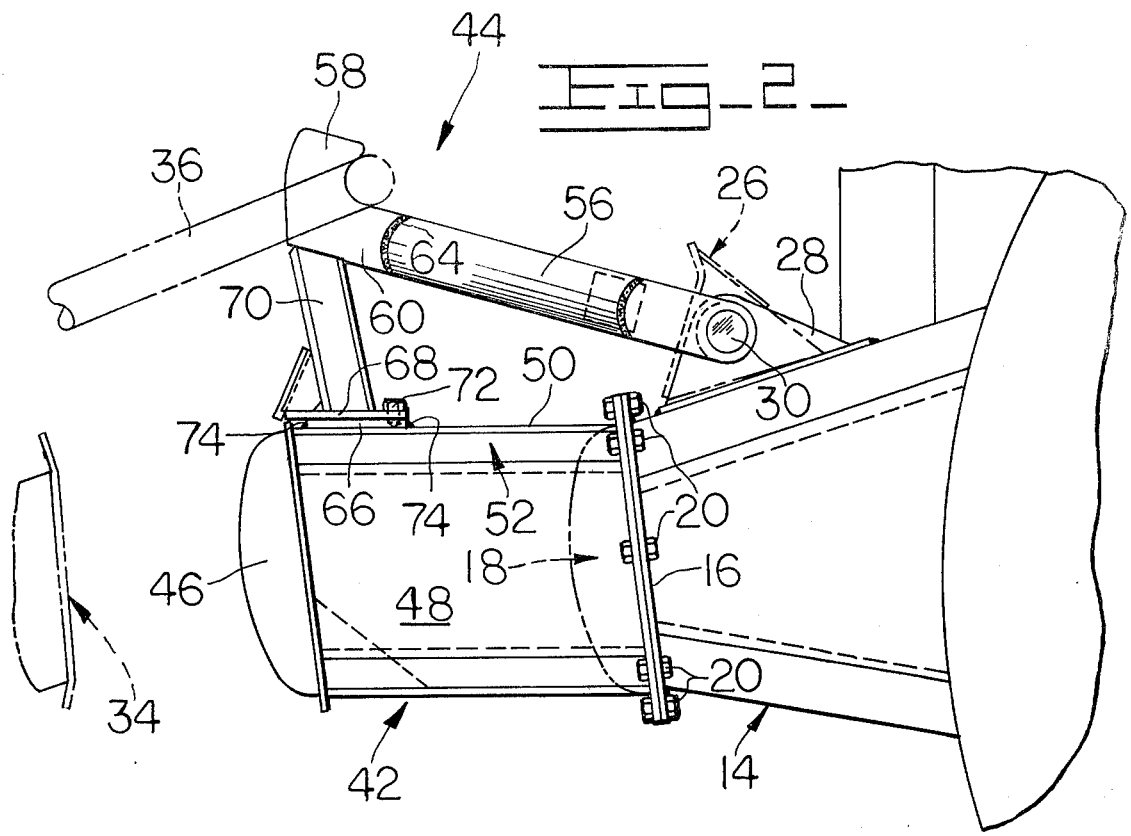
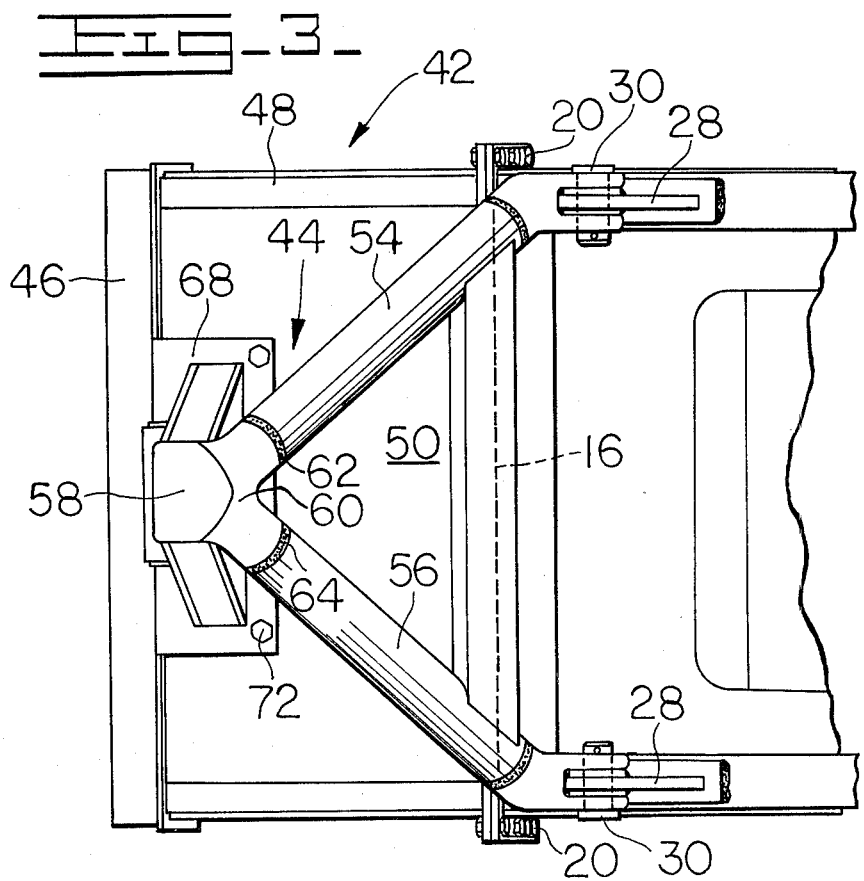

METHOD OF INSTALLING A PUSH-PULL COUPLING ON A SCRAPER VEHICLE

BACKGROUND OF THE INVENTION

The present invention contemplates a method of replacing a conventional push block assembly on a vehicle with a rearwardly extended push block unit and pulling hook of a type suitable for use in push-pull operations.

Push-pull couplings of the type particularly contemplated by the present invention are known in the prior art, specific reference being made to the U.S. Pat. No. 3,434,738 which is assigned to the assignee of the present invention and discloses a a push block and associated hook of the type referred to herein for use in push-pull operations.

Such couplings have been found to facilitate push-pull operation of vehicles such as earth moving scrapers in tandem in order to assist each other in obtaining a full load. For example, each vehicle may be equipped with a rearwardly extending push block and hook element as well as a forwardly extending push block and movable bail. Each vehicle may thus be employed in combination with similarly equipped vehicles for push-pull operation. The movable bail is engaged with the hook in order to permit a leading vehicle to pull a trailing vehicle. On the other hand, the rear vehicle may also engage the forward vehicle through their aligned push blocks in order to permit the trailing vehicle to push the forward vehicle and facilitate its loading operation. The push-pull couplings are of particular advantage since they eliminate the need for a separate pusher vehicle. After the tandem scraper vehicles are both loaded, they may rapidly uncouple from each other for transport operation to a suitable unloading site.

SUMMARY OF THE INVENTION

It is a particular object of the present invention to provide a method for rapidly converting a vehicle to include a rearwardly mounted push block and associated pulling hook of a type suitable for push-pull operation as generally disclosed above.

It is a further object of the invention to provide such a push block and associated pulling hook combination wherein the push block is rigidly fixed in rearwardly extended relation from a frame portion of the vehicle, the pulling hook being rigidly secured to the extended push block unit, the extended push block unit and pulling hook also being adapted for removal from the vehicle when necessary or desired.

Additional objects and advantages of the invention will be made apparent in the following description having reference to the accompanying drawings.

DESCRIPTION OF THE DRAWINGS

FIG. 2 is an enlarged fragmentary view illustrating the manner in which the push block and pulling hook combination are mounted at the rear of the vehicle in place of a conventional push block assembly and radiator guard assembly.

FIG. 3 is also an enlarged, fragmentary view taken from the top of FIG. 2.

DESCRIPTION OF THE PREFERRED EMBODIMENT

Figure 1:
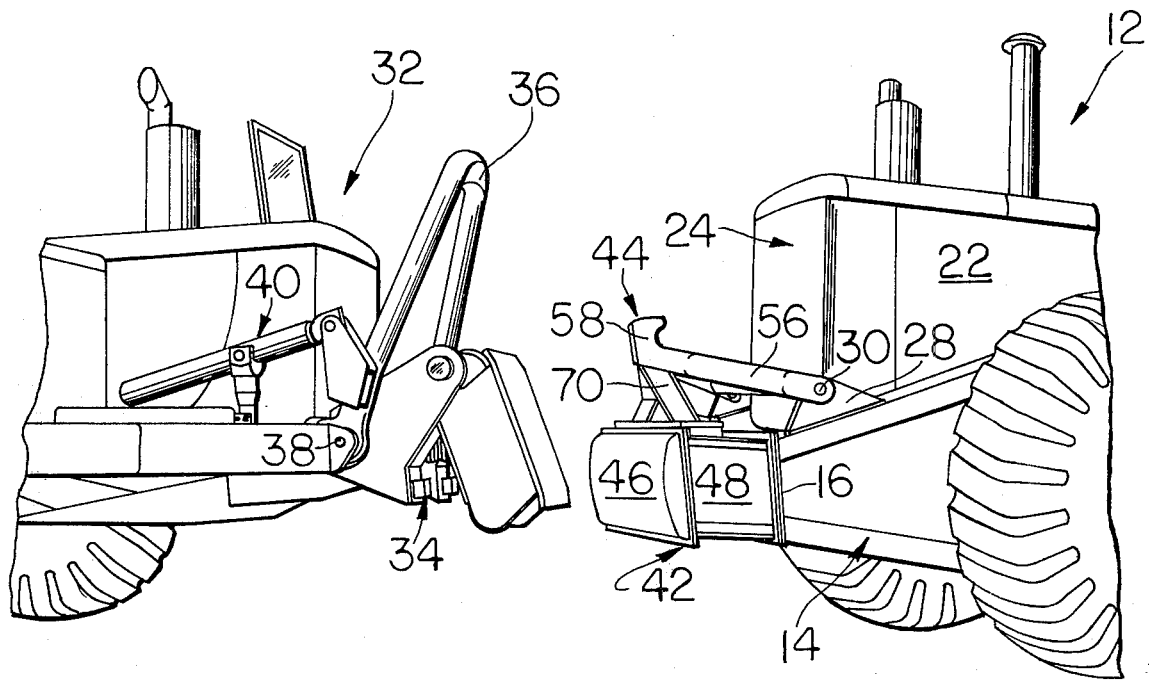
FIG. 1 is a partial side view, in elevation, of a pair of vehicles adapted for push-pull operation by coupling means including a rearwardly extending push block and pulling hook combination mounted at the rear of the leading vehicle in accordance with the method of the present invention.
Figure 4:
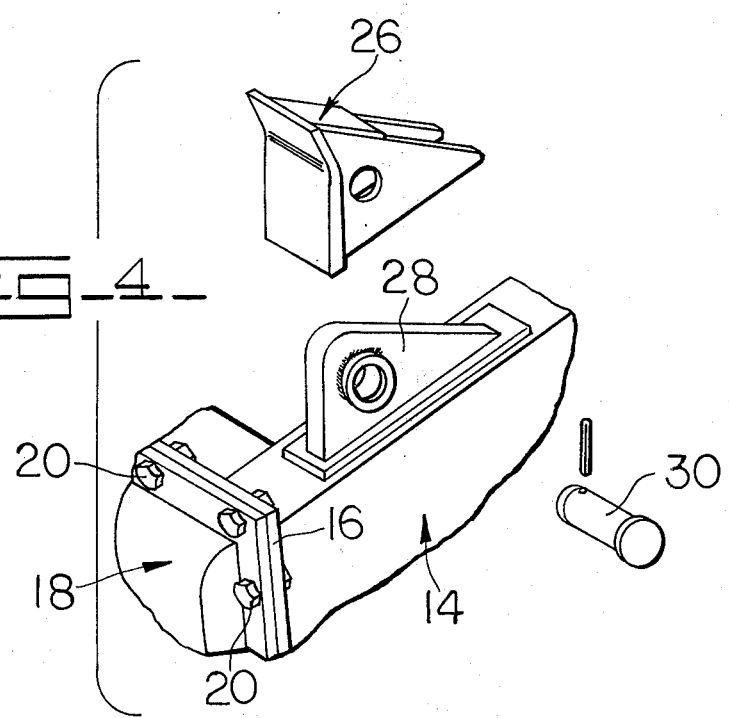
FIG. 4 is an isometric, fragmentary view to more clearly illustrate replaceable mountings within the arrangements of FIGS. 1–3.

The present invention particularly contemplates a method employed in combination with a vehicle of the type indicated at 12 in FIG. 1 in order to adapt it for push-pull operation as described above. Referring also to FIG. 2, such a vehicle includes a rearwardly extending frame portion 14 having a generally vertical mounting plate 16 adapted to receive a conventional push block assembly of a type indicated in phantom at 18. The vertical mounting plate 16 is preferably adapted for replaceable mounting of the push block assembly 18, for example, by means of bolts 20 in order to facilitate replacement of the push block 18 when it experiences excessive wear or becomes damaged during operation.

The vehicle 12 is also contemplated as being of a type having a rearwardly mounted prime mover or engine 22 with a radiator 24 mounted just forwardly of and above the vertical support plate 16. Accordingly, the vehicle also conventionally includes radiator guards 26 secured to respective brackets 28 which are fixed to the rearwardly extending frame portion. The radiator guards 26 are mounted upon the brackets 28 by means of transversely extending pivot pins 30.

In order to better illustrate the push-pull manner of operation contemplated for the scraper vehicle 12, FIG. 1 also illustrates similarly equipped scraper vehicle 32 having a forwardly arranged push block unit 34 and a bail 36 which is pivotably mounted at 38 and movable under the influence of a hydraulic jack 40.

The construction of illustrated portions of the trailing vehicle 32 is not of relative importance within the present invention except to indicate the provision of the forwardly mounted push block unit 34 and movable bail 36 as illustrated in FIG. 1 and shown in phantom in FIG. 2.

The present invention contemplates replacement of the conventional push block assembly 18 and radiator guards 26 by means of a push block unit 42 and a pulling hook as generally indicated at 44. It is also of relative importance to note that the push block unit 42 associated with the pulling hook 44 includes a push block 46 adapted for replacable engagement upon the vertical mounting plate 16 by means of a longitudinally extending frame structure 48. Preferably, the push block 46 is integrally formed together with the frame extension 48 as generally illustrated in FIG. 2.

The method of replacing the push block assembly 18 and radiator guards 26 with the extended push block unit 42 and pulling hook 44 is described below having particular reference to FIGS. 2 and 3.

Initially, the conventional push block assembly 18 is removed from the generally vertical mounting plate 16 by removal of the bolts 20. The radiator guards 26 are also removed from the brackets 28 by removal of the pivot pins 30.

With both the conventional push block assembly 18 and the radiator guards 26 being removed, the extended push block unit 42 including the integrally formed push block 46 and frame extension 48 is replacably secured upon the vertical mounting plate 16 by means of the mounting bolts 20. The frame extension 48 preferably includes an upper surface 50 being formed by a structural element 52 of the frame extension 48 in order to provide rigid and adaptable support for the pulling hook 44 in a manner described below. The pulling hook 44 is then replacably engaged with the brackets 28 by means of the pivot pins 30 while being secured to the frame extension 48.

The interconnection of the pulling hook 44 with the extended push block unit 42 is particularly adapted to facilitate a rigid, strong mounting for the pulling hook without introducing any additional stress within the pulling hook. Removal of the extended push block 42 and pulling hook 44 combination from the vehicle 12 when necessary or desired is also facilitated by the present design. The pulling hook 44 is preferably formed from three portions including a first element comprising a pair of rearwardly extending arms 54 and 56, each adapted for pivotably engagement with one of the brackets 28 by the pivot pins 30. Another element of the pulling hook 44 comprises a hook structure 58 including a bifurcated, forwardly extending structure 60 suitable for welded engagement with the arms 54 and 56 as indicated respectively at 62 and 64. As may be best seen in FIG. 2, a third element of the hook comprises a base plate 66 adapted to rest upon the upper surface 50 in a variable position depending upon location of the hook element 58 as described in greater detail below. The base plate 66 is adapted for releasable engagement with the hook element 58 by means of a similar plate 68 integrally secured to a support element 70 extending downwardly from the hook element 58. The plate 68 is secured to the base plate 66 by means of cap screws such as that indicated at 72.

The forwardly extending arms 54 and 56 may be rigidly secured to the hook element 58 by means of welds performed as indicated at 62 and 64 while also being releasably engaged with the brackets 28 by means of the respective pivot pins 30. The base plate 66 is then disposed upon the upper surface 50 in a position dictated by the location of the plate 68. The plate 68 is in turn located by the hook element 58 and its interconnection with the brackets 28 through the arms 54 and 56. With the base plate 66 being suitably disposed upon the upper surface 50, it is then secured to the structural member 52 by means of a weld indicated at 74. The plate 68 of the hook element 58 is preferably secured to the base plate 66 by means of the cap screws 72 prior to bonding of the base plate 66 to the structural element 52 in order to assure proper location of the base plate 66. However, it will be apparent that within the scope of the present invention, the plate 68 may also be secured to the base plate 66 after the base plate 66 is welded to the support element 52.

Accordingly, the extended push block unit 42 and the hook element 44 may readily be removed from the vehicle 12 simply by removal of the pivot pins 30 and bolts 20. With these units being mounted upon the vehicle 12 in the manner disclosed above, the push block 46 is rigidly supported in extended fashion from the frame portion 14 of the vehicle. Similarly, the hook 44 is provided with strong support through the brackets 28 and the frame extension 48 without any additional stresses being applied within the hook 44 during its mounting upon the vehicle together with the push block unit 42.

We claim:

1. In connection with a scraper vehicle having a rearwardly mounted engine, a rearwardly extending frame portion of the vehicle including a generally vertical mounting plate for receiving a push block assembly to facilitate engagement of the scraper vehicle by a pusher vehicle and upwardly extending radiator guards secured to the rearwardly extending frame portion by means of brackets and transversely extending pivot pins, a method of replacing the push block assembly and radiator guards with an extended push block unit and a pulling hook for employment in combination with a forwardly mounted push block and movable bail on another pusher vehicle, comprising the steps of removing the push block assembly from the vertical mounting plate and removing the radiator guards from the brackets, forming the extended push block unit to integrally include a push block and a longitudinally extending frame structure adapted for mounting on the vertical mounting plate and including an upper surface formed by a structural member of the frame structure, replaceably securing the integral push block and frame extension to the vertical mounting plate, forming the pulling hook with forwardly extending arms adapted for pivotably engagement with the respective brackets and a separate base plate arranged for engagement with the upper surface on the frame structure, replaceably securing the forwardly extending arms of the pulling hook to the brackets by means of pivot pins, and then rigidly securing the base plate upon the upper surface of the frame structure by means of welding in order to provide structural support for the pulling hook while facilitating removal of the push block unit and pulling hook from the vertical mounting plate and brackets of the scraper vehicle.

2. The method of claim 1 further comprising the steps of forming the pulling hook in three portions comprising a first hook element, a second element including the forwardly extending arms and a third element comprising the base plate with means for releasably engaging the hook element, securing the forwardly extending arms to the respective brackets by means of the pivot pins, welding the arms to a bifurcated portion of the hook element, and then welding the base plate of the third element to the upper surface of the frame structure after situating the third element for proper alignment with the hook element.

3. The method of claim 2 further comprising the step of releasably engaging the third element with the hook element before welding its base plate to the upper surface of the frame structure.

4. The method of claim 2 wherein the scraper vehicle also includes a forwardly mounted push block and movable bail to adapt it for push-pull use in combination with similarly equipped scraper vehicle.

5. In connection with a push-pull vehicle having a rearwardly extending frame portion including a generally vertical mounting plate for receiving a push block assembly, a pair of brackets secured to the frame portion and including transverse pivot means, a method of replacing the push block assembly and radiator guards with an extended push block unit and a pulling hook at the rear of the scraper vehicle, comprising the steps of removing the push block assembly from the vertical mounting plate, securing a push block unit to the vertical mounting plate by means of a longitudinally extending frame structure adapted for replaceable engagement with the vertical mounting plate, forming the pulling hook in three portions comprising a first hook element having a bifurcated portion, a second element including two forwardly extending arms secured to the bifurcated portion, and a third element comprising a separate base plate suitable for fixed engagement with an upper surface on the frame structure, securing the forwardly extending arms to the brackets by means of the pins, and then welding the base plate of the third element to the upper surface of the frame structure after situating the third element for proper alignment with the hook element.

* * * * *